Figure 1:
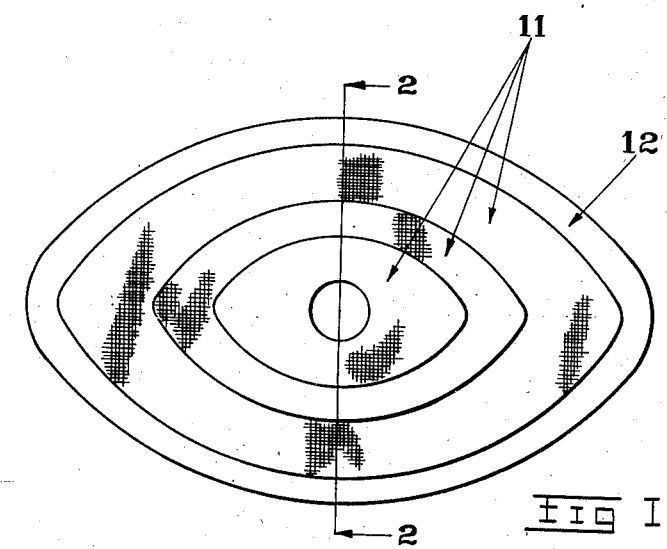

June 9, 1925.

W. DE RUSHA 1,541,119

FORMING HOLES IN RUBBER ARTICLES

Filed Oct. 27, 1921  2 Sheets-Sheet 1

WILLIAM DE RUSHA
INVENTOR

BY
ATTORNEY

June 9, 1925.

W. DE RUSHA 1,541,119

FORMING HOLES IN RUBBER ARTICLES

Filed Oct. 27, 1921  2 Sheets-Sheet 2

WILLIAM DE RUSHA
INVENTOR

BY
ATTORNEY

Patented June 9, 1925.

1,541,119

UNITED STATES PATENT OFFICE.

WILLIAM DE RUSHA, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

FORMING HOLES IN RUBBER ARTICLES.

Application filed October 27, 1921. Serial No. 510,940.

*To all whom it may concern:*

Be it known that I, WILLIAM DE RUSHA, a citizen of the United States, and a resident of Milwaukee, in the county of Milwaukee and State of Wisconsin, have invented certain new and useful Improvements in Forming Holes in Rubber Articles, of which the following is a specification.

Figure 2:
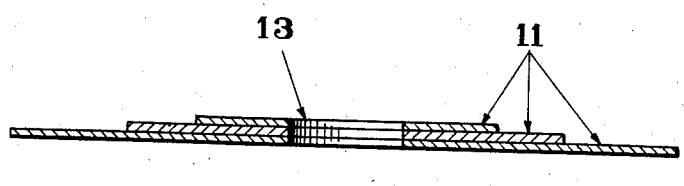
Figure 3:
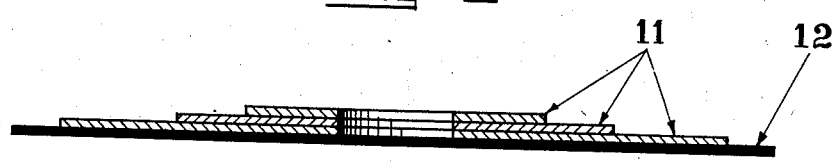
Figure 4:
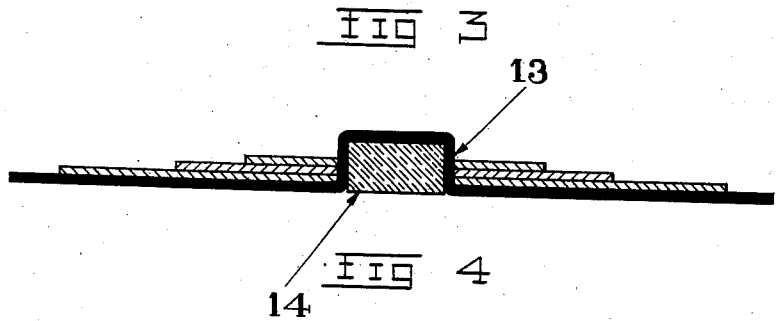
Figure 5:
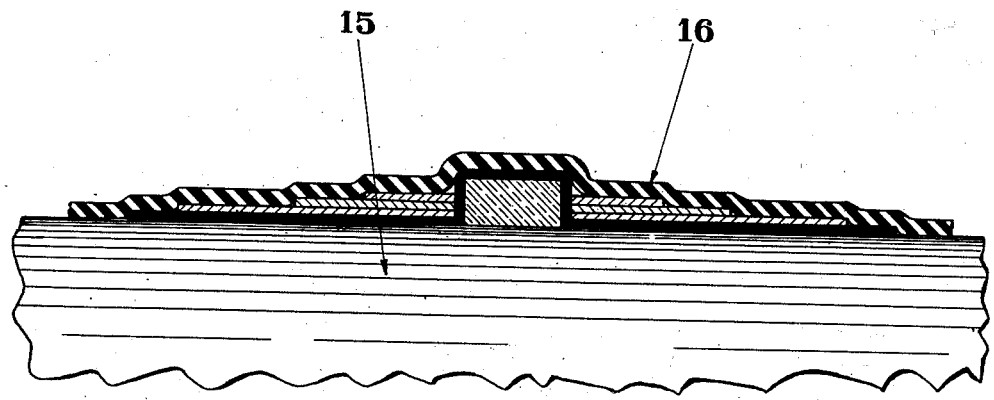
Figure 6:
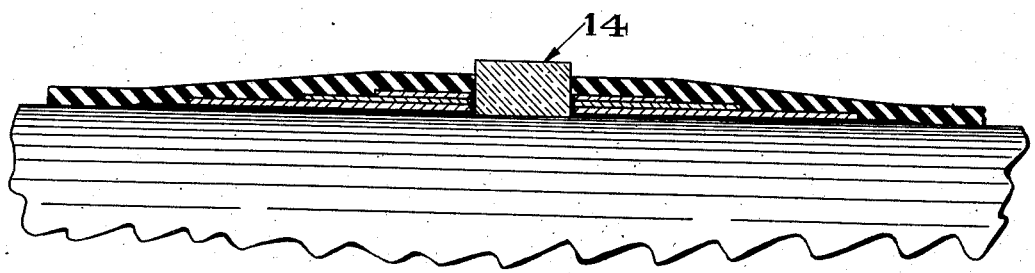
Figure 7:

My invention relates to forming holes in rubber articles and the principal object of my invention is to provide a new and improved method of forming such holes and particularly for forming the valve hole in an inner tube. In the drawings accompanying this specification and forming a part thereof I have shown, for purposes of illustration one form which my invention may assume. In these drawings:

Figure 1 represents a plan view of the reinforcing pads commonly used to reinforce the valve hole of an inner tube, Figure 2 shows this pad with a hole punched through the fabric and before the application of the rubber ply thereto, Figure 3 shows the pad after the application of the rubber ply, Figure 4 illustrates the pad after a plug has been pushed through the hole in the fabric in a direction to carry the rubber ply through with it, Figure 5 illustrates the pad of Figure 4 after the inner-tube stock has been applied, Figure 6 illustrates the completed article after vulcanization, while Figure 7 illustrates an alternative method of punching the pad.

Referring to the drawings, I have shown a valve pad comprising a plurality of layers of fabric 11 backed by a ply of rubber 12. In Figure 2 I have shown the plies of fabric assembled and provided with a hole 13 which may be formed in any suitable manner as by punching. In Figure 3 I have shown a continuous ply of rubber 12 applied to the punched fabric plies, while in Figure 4 I have shown a plug 14 forced through the hole 13 to carry with it under tension the portion of the rubber ply 12 which overlay the hole 13. In Figure 5 I have shown the assembled pad on a mandrel 15 with the inner tube stock 16 wrapped about it in such manner as to impart to that portion of the stock lying over the plug 14 a tendency to flow from over the plug. The tube thus mounted on the mandrel with the assembled valve pad in position is now vulcanized and during vulcanization the portion of the ply 12 lying over the plug 14 and the similar portion of the tube 16 flow from over the plug 14 to a position adjacent the plug to thus expose the plug 14 on both sides of the finished tube so that the plug may be readily removed to leave in the finished tube a hole which is in exactly the correct position and, because of the extension of the ply 12 through the hole in the fabric, is lined throughout with rubber and has no fabric exposed.

In the modification shown in Figure 7 the hole is punched through the pad after the rubber ply has been added but otherwise the process and product are the same.

I have disclosed herein one form which my invention may assume and a modification thereof but this disclosure is of course illustrative only and my invention is not limited thereto.

I claim:

1. The method of forming a hole in a rubber article which comprises cutting a hole at least part way through the reinforcing pad, inserting in said hole a plug which protrudes from the hole, pressing the rubber of the article against said plug in such manner that said rubber tends to move from over said plug, and vulcanizing.

2. The method of forming valve holes in tubes which comprises placing an apertured reinforcing pad over a ply of rubber, forcing the rubber ply through the aperture of said pad, applying the tube stock over said aperture and vulcanizing.

3. The method of forming valve holes in tubes which comprises placing an apertured reinforcing pad over an unbroken ply of raw rubber, inserting a plug in said hole to thereby force the rubber ply through the aperture of asid pad, applying the tube stock over said aperture and plug and vulcanizing under pressure.

4. The method of forming valve holes in tubes which comprises forcing a ply of rubber through the opening of an apertured reinforcing pad, retaining said ply in such assembled position applying tube stock over said assembly and vulcanizing under sufficient pressure to cause the tube stock and rubber ply to flow from the aperture to form a rubber lined passage in the tube.

In testimony whereof I have signed my name to the above specification.

WILLIAM DE RUSHA.